United States Patent
Broekaert

(10) Patent No.: US 6,249,312 B1
(45) Date of Patent: Jun. 19, 2001

(54) VIDEO CAMERA HAVING DEVIATING MEANS FOR IMPROVING RESOLUTION

(75) Inventor: Michel Broekaert, L'Etang-la-Ville (FR)

(73) Assignee: Sagem SA (FR)

( * ) Notice: Subject to any disclaimer, the term of this patent is extended or adjusted under 35 U.S.C. 154(b) by 0 days.

(21) Appl. No.: 08/967,543

(22) Filed: Nov. 12, 1997

(30) Foreign Application Priority Data

Nov. 15, 1996 (FR) .................................................. 96 13960

(51) Int. Cl.$^7$ ...................................................... H04N 5/225
(52) U.S. Cl. ............................................. 348/219; 348/208
(58) Field of Search ...................................... 348/208, 219, 348/241, 251, 187, 218, 242, 243, 244, 245, 246, 247, 248, 249, 240; 358/504

(56) References Cited

U.S. PATENT DOCUMENTS

| | | | | |
|---|---|---|---|---|
| 5,402,171 | * | 3/1995 | Tagami et al. | 348/219 |
| 5,450,126 | * | 9/1995 | Nishida | 348/208 |
| 5,514,865 | * | 5/1996 | O'Neil | 358/474 |
| 5,517,238 | | 5/1996 | Hirasawa . | |
| 5,712,474 | * | 1/1998 | Naneda | 348/208 |
| 5,734,933 | * | 3/1998 | Sekine et al. | 318/208 |
| 5,754,226 | * | 5/1998 | Yamada et al. | 348/219 |
| 5,831,671 | * | 11/1998 | Chigira et al. | 348/208 |
| 5,889,553 | * | 3/1999 | Kino et al. | 348/208 |

FOREIGN PATENT DOCUMENTS

| | | |
|---|---|---|
| 0 289 182 | 11/1988 | (EP) . |
| 0 358 196 | 3/1990 | (EP) . |
| 0483530 | 9/1991 | (EP) . |
| 0669757 | 2/1995 | (EP) . |
| 0 669 757 | 8/1995 | (EP) . |
| 2661583 | 10/1991 | (FR) . |
| 2 037 119 | 7/1980 | (GB) . |
| 2 250 155 | 5/1992 | (GB) . |
| 93/25043 | 12/1993 | (WO) . |

* cited by examiner

Primary Examiner—Wendy R. Garber
Assistant Examiner—Mitchell White
(74) Attorney, Agent, or Firm—Larson & Taylor, PLC

(57) ABSTRACT

The video camera comprises a detector having a two-dimensional matrix of photosensitive sites that accumulate charge, the sites being placed in an image plane of an optical system and being connected to a circuit for periodically transferring the accumulated charges at a determined frequency. A deviation member is interposed on the path of light towards the matrix and enables said path to be deflected about a nominal direction. A unit for periodically controlling the deviation means causes the image to be deviated in two dimensions, in a first determined cycle each time through a determined fraction of the pitch step size so as to perform space oversampling, and, in a second cycle, each time through a full pitch step size, which second cycle is a multiple of the first. A processor unit calculates the gain differences and the response offsets between the sites by performing comparisons therebetween.

8 Claims, 2 Drawing Sheets

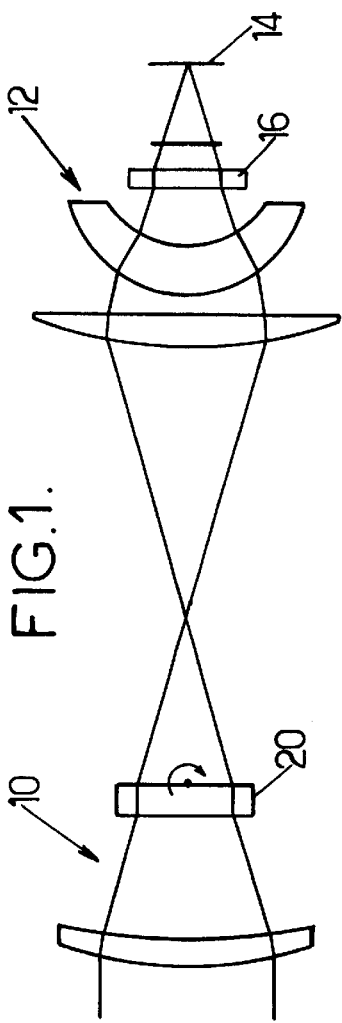
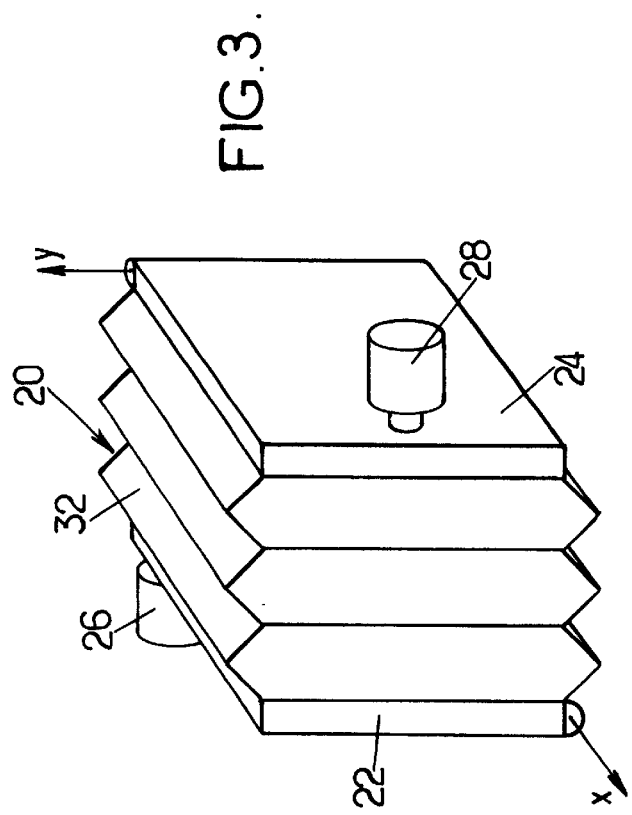

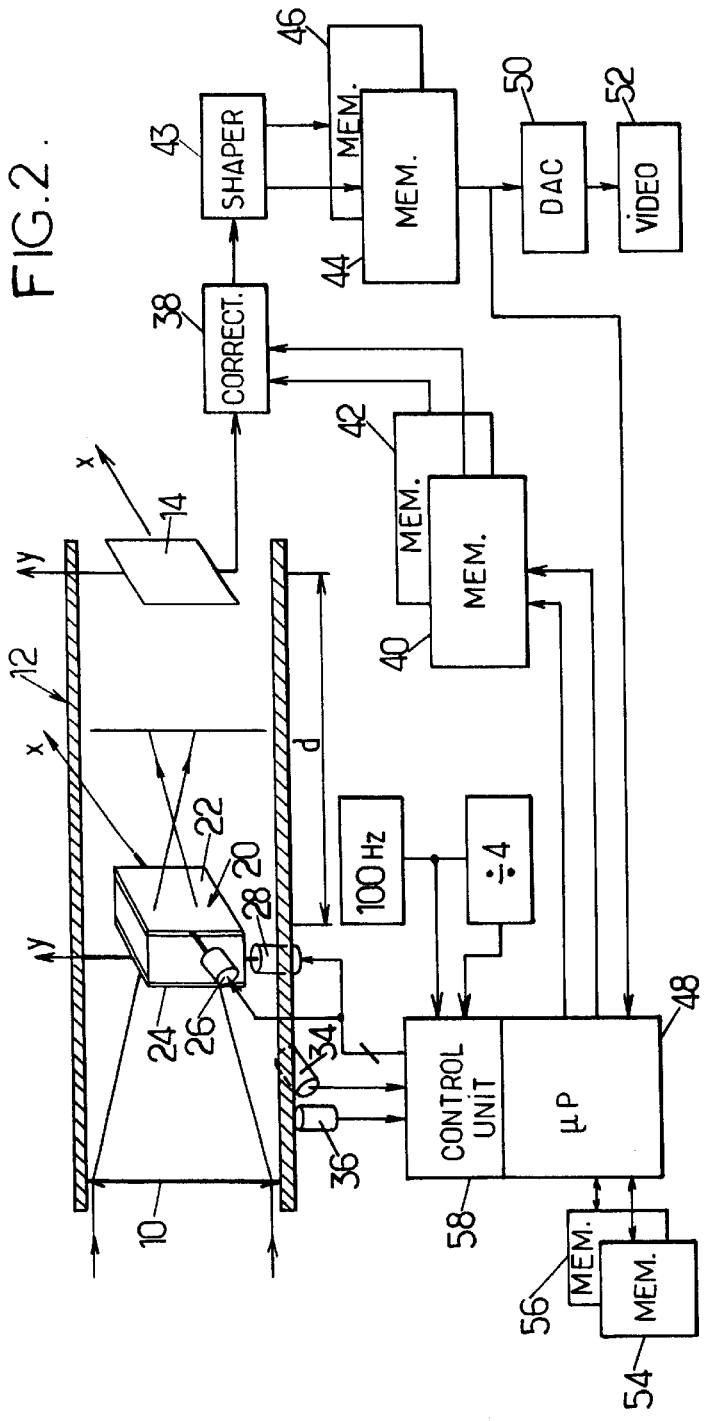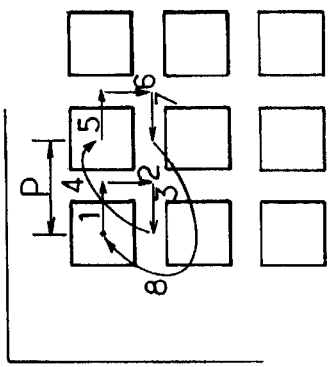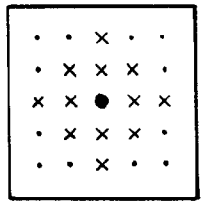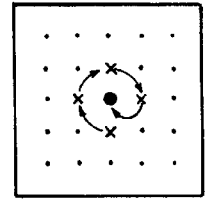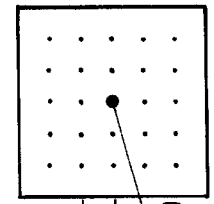

VIDEO CAMERA HAVING DEVIATING MEANS FOR IMPROVING RESOLUTION

BACKGROUND OF THE INVENTION

The present invention relates to video cameras of the type comprising: a detector having a two-dimensional matrix of photosensitive sites that accumulate charge, distributed at a determined pitch or spacing, placed in an image plane of an optical system, and connected to a circuit for periodically transferring the accumulated charges at a determined frequency; and a deviation member interposed on the light path between an entrance pupil and the matrix, enabling said path to be deflected in all directions about a nominal direction.

The number of photosensitive sites in such a matrix is limited. To improve the image, proposals have already been made for cameras in which the deviating means is controlled in such a manner as to perform micro-scanning at a pitch that is smaller than the site-distribution pitch, thereby improving spatial resolution by oversampling the scene observed by the camera.

For example, each photosensitive site can be made to correspond in succession with four different points of the scene for a given orientation of the beam input into the camera.

It is also known that the photosensitive sites do not all have exactly the same response, whether in their initial state or as a result of being subjected to different changes over time. Methods already exist for calibrating and storing the characteristics of the sites, so that corrections can subsequently be performed by calculation. Such calibration constitutes a prior operation and requires additional means to be implemented.

SUMMARY OF THE INVENTION

An object of the invention is to provide a video camera of the above-defined type in which several functions are integrated in a same assembly, thereby considerably simplifying design and implementation of the camera.

To this end, the invention provides, in particular, a camera of the above-defined type, which comprises:
- a unit for periodically controlling the deviation member, capable of causing the image to be deviated in two dimensions, each time through a determined fraction of a pitch step size, implementing a first determined cycle so as to perform space oversampling, and capable, in a second cycle, of causing the image to be deviated, each time through a complete pitch step size, which second cycle is a multiple of the first;
- a processor unit serving to calculate gain differences and response offsets between sites by comparing the responses of two sites exposed successively to the same point of a scene, and for providing data enabling said differences and offsets to be compensated; and
- vibration detectors providing the control unit with signals in two directions orthogonal to the light beam passing through the inlet optical system, and said unit is designed to control the deviation member so as to compensate for the vibration.

On-board or hand-held cameras also suffer from the problem of vibration caused by the support which tends to smear the image. The invention performs stabilization simultaneously with the micro-scanning and uses the same deviating member.

The camera may include simultaneously all three functions of micro-scanning, of making response uniform, and of stabilization; it may also be designed to optionally perform only two of those three functions simultaneously, for example only micro-scanning and stabilization.

The above features and others appear better on reading the following description of a particular embodiment, given by way of non-limiting example. The description refers to the accompanying drawings.

BRIEF DESCRIPTION OF THE DRAWINGS

FIG. 1 is a theoretical diagram showing the general structure of a video camera that can be used for forming infrared images, and to which the invention can be applied;

FIG. 2 is a block diagram for showing the essential components for implementing the invention;

FIG. 3 is a simplified perspective view showing one possible structure for a deviating member that can be used in the camera of FIG. 2;

FIGS. 4A, 4B, and 4C show successive calibration steps when implementing a device of the kind shown in FIG. 2; and FIG. 5 shows the path followed by the image of a point in the scene over the matrix of photosensitive sites, during a deviation sequence serving simultaneously to perform over-sampling by micro-scanning, and to perform calibration.

DETAILED DESCRIPTION

FIG. 1 shows the theoretical structure of a video camera to which the invention is applicable. It comprises an inlet optical system 10 for transforming a parallel inlet beam into a converging beam which is taken up by an outlet optical system and is focused on a two-dimensional matrix 14 of photosensitive sites, such as a matrix of CCD sensors. A color filter 16 and/or a diaphragm can be interposed on the path of the beam.

A deviating member 20 can be interposed on the path of the beam in order to deviate it through an angle that is small relative to the angular field of the camera.

Usually, such deviating means which may be of various structures (diasporometer, liquid-filled cell with tiltable faces to make a prism) is placed in the parallel inlet beam.

That solution makes it necessary to use a deviation means 20 of a diameter that is practically equal to that of the inlet optical system. Unfortunately, such an optical system must be of large diameter when the camera is designed to form images of a scene in the infrared, and in particular in the thermal infrared. Under such circumstances, the use of deviating means constituted by a cell having inclinable faces is difficult to envisage. The cost of a cell containing a liquid that is transparent in the far infrared (e.g. $CS_2$) and having walls constituted by optical plates having parallel faces and made of a material that is transparent in the same way (ZnSe, ZnS, Ge) becomes prohibitive.

At first sight, it would appear that the quality of the image is highly degraded, for constant amplitude of deviation, if the deviating means is located on the converging portion of the beam. Nevertheless, it turns out that the quality of the image is not significantly degraded providing the movements are restricted to relatively small values, smaller than 1°. This angle is more than enough for giving rise to a change in the location of a point of the scene on the matrix 14 that represents a significant fraction of the dimension of the matrix 14. For example, an angular displacement of ±0.5° can give rise to a displacement on the matrix of amplitude ±0.38 mm, i.e. about ⅛ of the matrix, when the matrix has a dimension in each direction of 6 mm. If necessary, this value can be increased by providing means for displacing the matrix in its own plane, through a determined number of distribution steps of the photosensitive sites.

When, as is the usual case, one of the faces of the cell 20 can be displaced above a first axis z that is orthogonal to the optical axis, and the other cell can be steered about an axis y that is orthogonal to the preceding axis, then the difference between the scale factors (ratio between the movement of the image over the matrix and the angle of inclination of the face) remains small. In a representative example, the difference between them is about 5%. That can be taken into account in the control systems.

The camera shown in overall block diagram in FIG. 2 can perform the functions defined above, namely:
- an improvement in spatial resolution due to microscanning;
- an improvement in image uniformity by calibrating and correcting of gain dispersion and offsets of the photosensitive sites; and
- stabilization of the image in order to avoid losing resolution, in the event of vibration.

When only two of the three objects are looked for, some of the elements can be omitted and the control process can be simplified.

In FIG. 2, where elements corresponding to those of FIG. 1 are given the same reference numerals, there can be seen a deflector constituted by two plates 22 and 24 interconnected by a flexible element and defining a cell filled with liquid. The plate 22 can be steered by means 26 about an axis x that is orthogonal to the optical axis and generally parallel to one of the directions of the matrix 16. The other plate 24 can be steered by a second motor 28 about an axis y that is orthogonal both to the optical axis and to the axis x. Any angular deviation of the beam caused by the deviating means 20 gives rise to an x or a y deviation, depending on circumstances, that is substantially proportional to the distance d and to the angle of angular deviation.

FIG. 3 shows a possible embodiment of the FIG. 2 deviation means. The two walls 22 and 24 are constituted by plates of material that is transparent to the radiation and that are mounted on the structure 30 of the camera in such a manner as to be capable of rotating about respective axes x and y. The edge of each plate remote from its axis of rotation is secured to respective means 26 and 28 constituted, for example, by piezoelectric actuators. Such actuators, comprising a stack of pellets, can generate displacements through several tens of microns. It necessary, the stack can be replaced by a bimetallic strip device capable of achieving, without difficulty, displacement through an amplitude of about 150 μm.

Walls 22 and 24 are interconnected by a bellows 32 that is generally made of plastics material or metal, and that serves to absorb the changes in volume caused by relative displacement of the two walls. This accommodates the incompressibility of the liquid.

There follows a description of the sequences of operations that enable the above functions to be performed.

The lack of uniformity in the characteristics of the photosensitive sites is corrected on the following basis. The natural sources contained in the scene under observation by the camera change little from one image to the next. By moving to each observation site, between two successive images, that which was being observed by an adjacent site in the preceding image, it is possible in cascade to calibrate all of the sites, using some particular site as the reference, e.g. the site $P(x_0, y_0)$ situated at the center of the matrix (FIG. 4A).

In the particular case of a matrix having a few sites only, as shown in FIGS. 4A to 4B, it is possible to take as the reference the central site at which the gain is $G_0$, and the zero offset is $\theta_0$. The response $\phi_{i,j}$ of a site occupying row i and column j of the matrix can then be written:

$$\phi_{i,j} = G_{i,j} \cdot r_{i,j} + \phi_{i,j} \qquad (1)$$

If between the formation of one image at instant t and the formation of the following image at instant t+T, the image of the scene is offset through one step on the matrix in the row direction, then the following should apply:

$$\phi_{i,j}(t) = \phi_{i,j+1}(t+T)$$

If the image obtained at time t is stored, then it is possible by comparison to determine the difference between the site $P(x_0, y_0)$ and an adjacent pixel. The operation can be repeated to determine the differences between the central site and the four sites next to it, as given by the cross in FIG. 4B. It is thus possible to propagate the calibration from site to site over the entire matrix (FIG. 4C), to obtain a neural network effect.

When oversampling is intended to double resolution in both directions, it is performed by successively offsetting the image through p/2 over the matrix by controlling the deflector 20. For example, when it is desired to display at 25 Hz with a resolution of p/2, then the deviation means is caused to operate at a rate of 100 Hz. For a matrix in which the light integration time is 100 μs and a frame occupies 10 ms, the deviation means must achieve a change in the position of the image in a period of 9.9 ms.

The movements required for oversampling can be combined with the movements required for calibration as shown in FIG. 5 in which a sequence comprises successive displacements numbered 1 to 8.

Finally, vibration correction for stabilizing the image requires angular displacements of the camera to be measured. In the case shown in FIG. 2, two gyros 34 and 36 are mounted on the housing of the camera and provide output signals representative of velocities $V_x$ and $V_y$ about two axes x and y.

The corrections to be provided, δx and δy are proportional to $V_x$ and $V_y$ and can be considered as being constant between two images at 100 Hz:

$$\delta x(t) = k_x \cdot V_x(t)$$

$$\delta y(t) = k_y \cdot V_y(t)$$

where $k_x$ and $k_y$ are constants that are measured or calibrated.

The angles at the apex δα and δβ to be given to the deviation means are then such that:

$$\delta x \approx d \cdot (n-1) \cdot \delta\alpha$$

$$\delta y \approx d \cdot (n-1) \cdot \delta\beta$$

where n is the refractive index of the liquid.

All three actions can be combined merely by linear composition, with the deviation means being modified at a rate of 100 Hz. For example, in the direction x, the total displacement to be generated is the following sum:

$$dx + \Delta x + \delta x(t)$$

where dx can take values of 0 and ±p, and Δx can take values of 0 and ±p/2. In the direction Y, the displacement can be written:

$$dy + \Delta y + \delta y(t)$$

The control circuit associated with the electrooptical portion of the camera can have the structure shown in FIG.

2. The output signals from the matrix 14 are applied in sequence to a correction circuit 38 which receives, synchronously with the signals, appropriate gain and offset values are previously calculated and stored in memories 40 and 42. The corrected signals are shaped at 43 and are stored in memories 44 and 46, each having a capacity of one image. Comparing the outputs from adjacent sites in the two memories 44 and 46 makes it possible to perform calibration as mentioned above. Finally, the memorized signals are shaped in analog manner by a converter 50 and can be displayed on a video monitor 52.

Calibration, i.e. calculating the coefficients $G_{i,j}$ and $\theta_{i,j}$ of equation (1) can be performed by space-time filtering using an algorithm of the least squares type for minimizing error on successive measurements by a site i,j relating to a mean of measurements performed on adjacent sites, e.g;:

i, j+1 at t−T i+j, j at t−2T i, j−1 at t−3T e−1, j at t−4T i, j−1 at t−3T i−1, j at t−4T

The calculation can be performed by storing a plurality of successive non-corrected images in memories (not shown in FIG. 2), and by offsetting the read addresses of the memories relative to their write addresses during acquisition.

The calculation functions required for calibration purposes can be performed by a processor unit constituted by a micro-processor 48 provided with binary memories 54 and 56 making it possible to track changes in gain and offset. The reference deviation amounts can be delivered to the motors 26 and 28 by a special calculation and control unit 58 containing the algorithm for calculating deviation including two fixed sequences at 25 Hz and 100 Hz, and variable correction for vibration performed at a rate of 100 Hz. These frequencies and the other numerical values are given merely by way of example. For an image frequency of 30 Hz, it is possible to use an oversampling frequency of 120 Hz. Calibration can be performed by making comparisons between some larger number of images, and not only between the current image and the preceding image. The deviation means described by way of example could be replaced by some other device, having a passband that is sufficient to enable vibration to be corrected.

What is claimed is:

1. A video camera comprising:

a detector having a two-dimensional matrix of photosensitive sites apt to accumulate charges, distributed at a determined spacing, placed in an image plane of an optical system, and connected to a circuit for periodically transferring the accumulated charges at a determined frequency;

a deviation member interposed on the light path between an entrance pupil and the matrix for deflecting said path in all directions about a nominal direction;

a control unit for periodically controlling the deviation member, for causing deviations of the light path in two mutually orthogonal directions, each time for moving an image formed on the detector through a fraction of said spacing and combining said deviations for implementing a first determined cycle performing spatial oversampling in said two directions and combining said first cycle with a second cycle, causing a deviation of the image, each time through a complete said spacing, second cycle having a duration which is a multiple of the first cycle; and a processor unit arranged for calculating gain differences and response offsets between different ones of said sites by comparing the responses of at least two sites exposed successively to a same point of a scene due to said second cycle, for providing data enabling said differences and offsets to be compensated, and for providing an output image having a spatial resolution increased in reverse proportion of said fraction; and vibration detectors providing the control unit with signals responsive to angular movements about two directions orthogonal to the light beam passing through the inlet optical system, said control unit being further arranged to control said deviation member so as to compensate for vibration of the camera.

2. A camera according to claim 1, including a correction circuit receiving the output signals from the matrix and correction data from the processor unit.

3. A camera according to claim 1, wherein the deviation means is placed between the detector and an entrance of an optical system of the camera, on a converging portion of an entrance light beam.

4. A camera according to claim 1, wherein the deviation means is constituted by a cell having plates with parallel faces made of a material that is transparent in the infrared, co-operating with a junction bellows to define a cavity filled with a liquid that is transparent in the infrared.

5. A camera according to claim 4, wherein each of said plates is connected to a piezoelectric actuator enabling it to be rotated about an axis, axes of rotation of the two plates being mutually orthogonal.

6. A video camera according to claim 1, wherein the second cycle involves only two said sites and both cycles are implemented together in eight successive steps.

7. A video camera according to claim 1, wherein the second cycle involves five sites mutually adjacent along to the two mutually orthogonal directions.

8. A camera according to claim 1, wherein said control unit is arranged to enable the image to be deviated cyclically through a pitch of step size equal to said spacing with a cycle duration that is four times greater than a cycle duration of deviations of an amount equal to half said spacing in both directions.

* * * * *